US010934188B2

(12) United States Patent
Vidic (10) Patent No.: US 10,934,188 B2
(45) Date of Patent: Mar. 2, 2021

(54) TREATMENT OF PRODUCED WATER

(71) Applicant: University of Pittsburgh—Of the Commonwealth System of Higher Education, Pittsburgh, PA (US)

(72) Inventor: Radisav D. Vidic, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 432 days.

(21) Appl. No.: 15/265,190

(22) Filed: Sep. 14, 2016

(65) Prior Publication Data

US 2017/0073255 A1 Mar. 16, 2017

Related U.S. Application Data

(60) Provisional application No. 62/218,889, filed on Sep. 15, 2015.

(51) Int. Cl.
| | |
|---|---|
| *C09K 8/62* | (2006.01) |
| *C02F 1/52* | (2006.01) |
| *C09K 8/66* | (2006.01) |
| *C02F 103/10* | (2006.01) |
| *C02F 101/00* | (2006.01) |
| *C02F 1/00* | (2006.01) |
| *C02F 101/10* | (2006.01) |
| *C02F 1/66* | (2006.01) |

(52) U.S. Cl.
CPC .............. *C02F 1/5236* (2013.01); *C09K 8/66* (2013.01); *C02F 1/66* (2013.01); *C02F 2001/007* (2013.01); *C02F 2101/006* (2013.01); *C02F 2101/10* (2013.01); *C02F 2103/10* (2013.01); *C02F 2303/18* (2013.01)

(58) Field of Classification Search
CPC .............. C09K 8/62; C09K 8/665; C02F 1/66
USPC ....................................................... 166/267
See application file for complete search history.

(56) References Cited

U.S. PATENT DOCUMENTS

| | | | | |
|---|---|---|---|---|
| 8,801,897 | B2* | 8/2014 | Duesel, Jr. ............. | C02F 1/008 159/47.3 |
| 9,221,697 | B2 | 12/2015 | Keister | |
| 2011/0100924 | A1* | 5/2011 | Duesel, Jr. ............. | B01D 1/14 210/710 |
| 2014/0286854 | A1* | 9/2014 | Keister ................. | E21B 43/40 423/580.1 |

OTHER PUBLICATIONS

He, C., Zhang, T., and Vidic, R.D. Use of abandoned mine drainage for the development of unconventional gas resources, Disruptive Science and Technology, 1(2013), 169-176.

(Continued)

*Primary Examiner* — Zakiya W Bates
*Assistant Examiner* — Ashish K Varma
(74) *Attorney, Agent, or Firm* — Bartony & Associates, LLC (57) ABSTRACT

A method of treating produced water from subterranean operations includes charging produced water into a container to create a mixture of the produced water and an aqueous medium including a source of sulfate ions within the container, removing an outflow via an outlet in the container; and charging barite particles into the container.

20 Claims, 8 Drawing Sheets

(56) References Cited

OTHER PUBLICATIONS

He, C., Li, M., Liu, W., Barbot, E. and Vidic, R.D. Kinetics and equilibrium of barium and strontium sulfate formation in Marcellus Shale produced water, Journal of Environmental Engineering, 140(2014), B4014001.
Kondash, A.J., Warner, N.R., Lahav, O. and Vengosh, A. Radium and barium removal through blending hydraulic fracturing fluids with acid mine drainage, Environmental Science and Technology, 48(2013), 1334-1342.
Singer, P.C. and Stumm, W., Acidic Mine Drainage: The Rate-Determining Step, Science 167(3921), 1121-1123 (1970).
He, C. and Vidic, R.D. "Application of AMD for produced water reuse: Equilibrium and kinetics of Chemical precipitation" 249th ACS National Meeting & Exposition, Denver, CO, Mar. 22-26, 2015.
Vidic, R.D. "Sustainable Water Management for Unconventional Gas Extraction in Marcellus Shale" Keynote Presentation, NSF Workshop: Development of Green Fracturing Fluids and Sustainable Remediation and Containment Technologies, University of Arkansas at Little Rock, Apr. 20-21, 2015.

\* cited by examiner

TREATMENT OF PRODUCED WATER

CROSS-REFERENCE TO RELATED APPLICATIONS

This application claims benefit of U.S. Provisional Patent Application Ser. No. 62/218,889, filed Sep. 15, 2015, the disclosure of which is incorporated herein by reference.

GOVERNMENTAL INTEREST

This invention was made with government support under grant no. DE-FE0000975 awarded by the Department of Energy. The government has certain rights in this invention.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Produced water generated during shale gas extraction in Pennsylvania is mostly reused for hydraulic fracturing operation. Acid, Abandoned or Active Mine Drainage (collectively, AMD), one of the most serious threats to water quality in Pennsylvania, can potentially serve as a make-up water source to enable produced water reuse. Produced water includes all water that exits a well used in subterranean well operations such as in hydrocarbon recovery (for example, in hydraulic fracturing operations). The term "flowback water" typically reflects that portion of the fluid that comes back from the well during the first 10-14 days after well completion. Produced water includes all water produced from a well (including, for example, flowback water and water that comes from the well during normal operation).

SUMMARY

In one aspect, a method of treating produced water from subterranean well operations (for example, subterranean hydrocarbon recovery operations such as underground hydraulic fracturing) includes charging produced water into a container (for example, via an inlet or inlet system in the container) to create a mixture of the produced water and an aqueous medium including a source of sulfate ions within the container, removing an outflow via an outlet in the container; and charging barite particles into the container. In a number of embodiments, charging barite particles into the container includes recycling at least a portion of the outflow including barite particles back into the container. In a number of embodiment, the pH within the container is maintained at no more than 5, nor more that 4 or no more than 3. The aqueous medium may, for example, includes water from acid, abandoned or active mine drainage. Barite particles produced in the method may, for example, include at least 90% of the radium from the produced water. Sulfuric acid and/or another acid may be added to the container. The average saturation index of barite in the container may, for example, be maintained to be at least 2.5, at least 3.5 or at least 4.0. In a number of embodiments, the average saturation index of barite in the container is maintained to be no greater 5, no greater than 4.25 or no greater than 4.1. The sulfate ion concentration in the outflow may, for example, be maintained below 100 mg/L.

In a number of embodiments, the portion of the outflow including barite particles recycled to the container is recycled from a settling system in operative connection with the container. The outflow from the container may, for example, be charged to a flocculation system, and the outflow of the flocculation system may be charged to the settling system. In a number of embodiments, barite particles removed from a sludge outflow of the settling system include less than 30% of barite particles having a diameter of less than 6 µm. The barite particles removed from the sludge outflow may, for example, be charged to a subterranean formation (in, for example, a hydrocarbon recovery process).

In another aspect, a system for treating produced water from subterranean well operations includes at least one container including an inlet system and an outlet system, a source of produced water in fluid connection with the inlet system, a source of an aqueous medium comprising sulfate ions in fluid connection with the inlet system, a source of barite particles in fluid connection with the inlet system, and a settling system in fluid connection with the outlet system. The source of barite particles may, for example, include a recycle stream from the settling system. The system may, for example, further include a flocculation system in fluid connection with the outlet system. The settling system may be in fluid connection with an outlet of the flocculation system. In a number of embodiment, the source of the aqueous medium includes acid, abandoned or active mine drainage.

The system may further include a source of sulfuric acid in fluid connection with the inlet of the system. As described above, the average saturation index of barite in the container may, for example, be maintained to be at least 2.5, at least 3.5 or at least 4.0. In a number of embodiments, the average saturation index of barite in the container is maintained to be no greater 5, no greater than 4.25 or no greater than 4.1. The sulfate ion concentration in the outflow may, for example, be maintained below 100 mg/L.

In a further aspect, composition for use in subterranean hydrocarbon recovery includes radium-containing barite particles formed by charging produced water from underground hydraulic fracturing operations into a container to create a mixture of the produced water and an aqueous medium including a source of sulfate ions within the container, removing an outflow from the container; and recycling barite particles from a portion of the outflow into the container.

The present devices, systems, and methods, along with the attributes and attendant advantages thereof, will best be appreciated and understood in view of the following detailed description taken in conjunction with the accompanying drawings.

DETAILED DESCRIPTION

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a container" includes a plurality of such containers and equivalents thereof known to those skilled in the art, and so forth, and reference to "the container" is a reference to one or more such container and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

A number of representative studies hereof demonstrates co-treatment of produced water and AMD produced in northeastern Pennsylvania in a representative pilot-scale system including rapid mixing reactor system, a flocculation system and a sedimentation system The reactor system may, for example, include one or more reactor tanks, while the flocculation system and the sedimentation system may, for example, include one or more flocculation tanks and one or more sedimentation tanks, respectively. Sulfate concentration in the finished water may be controlled at a desired level (for example, below 100 mg/L) by, for example, adjusting the ratio of produced water and AMD/sulfate in the influent. As known in the art, control over system variable may be maintained via a controller or control system that may include one or more processors (for example, microprocessor), which may be in operative connection with one or more sensors and flow control mechanisms. Ferric iron contained in the AMD may serve as a coagulant to enhance the removal of suspended solids, during which total iron is reduced to a desirable level.

Solid waste generated in processes hereof (including barite) incorporates over 99% of radium present in the produced water. In a number of embodiments, sludge recycling may be used (that is, recycling of barite particles formed in the system), thereby increasing the size of barite particles to a size suitable for use as, for example, a weighting agent in drilling fluid. The systems and methods hereof provide an alternative management approach for naturally occurring radioactive materials (NORM) in which barite products may be used to offset the treatment cost (thereby, promoting produced water reuse). Moreover, environmental impacts of AMD may be reduced, and pressure on fresh water sources may be reduced.

In a number of studies, produced water and AMD were collected from sites in northeastern Pennsylvania and stored in 20,000 gallon frac tanks for use in representative pilot-scale studies as described above. Characteristics of the impaired waters sampled from the storage tanks are summarized in Table 1 below. The produced water used in a number of studies contained much higher concentrations of divalent cations as compared with a number of other samples of produced water from southeastern Pennsylvania.

TABLE 1

| Constitutes | Produced Water | AMD |
|---|---|---|
| $Na^+$ (mg/L) | 31,382 ± 1207 | 37.6 ± 1.7 |
| $Ca^{2+}$ (mg/L) | 31,270 ± 621 | 66.3 ± 1.2 |
| $Mg^{2+}$ (mg/L) | 1,590 ± 49 | 82 ± 2.1 |
| $Ba^{2+}$ (mg/L) | 19,115 ± 166 | — |
| $Sr^{2+}$ (mg/L) | 16,141 ± 210 | — |
| $Cl^-$ (mg/L) | 152,213 ± 5670 | 166 ± 4 |
| $SO_4^{2-}$ (mg/L) | — | 275 ± 3 |
| Fe (III) (mg/L) | — | 29.7 ± 1.1 |

TABLE 1-continued

| Constitutes | Produced Water | AMD |
|---|---|---|
| Fe (II) (mg/L) | 28.2 ± 1.1 | 5.9 ± 0.2 |
| Ra-226 (pCi/L) | 15,570 ± 1823 | — |
| Ra-228 (pCi/L) | 1,385 ± 339 | — |
| TSS | 246 ± 4 | 6 ± 0.1 |
| pH | 6.2 ± 0.01 | 2.6 ± 0.01 |

The pH of AMD may vary significantly. One study found, for example, that pH of AMD varies widely from 2.7 to 7.3, with the majority being either acidic or neutral. AMD generally contains dissolved iron and the concentration may, for example, vary from below 0.1 mg/L to a few hundred mg/L. Low-pH AMD can contain both ferric and ferrous iron, and the ratio depends on geological conditions. The non-treated AMD used in the studies hereof was acidic and rich in ferric iron. Although ferric hydroxide can precipitate to form hematite, this process is limited kinetically, as it estimated to take over 4 months to accomplish the precipitation reaction considering the pH and ferric iron concentration of the AMD.

The sulfate concentration in the AMD collected for the studies hereof was very low compared to the barium concentration in the produced water (see Table 1). If the AMD percentage in the mixture corresponded to the unrecovered fraction of hydraulic fracturing fluid (i.e., 90% on average), the sulfate concentration in the effluent would be negligible because of the high molar ratio of barium to sulfate (5.6:1). Therefore, sulfate concentration in actual AMD and barium concentration in the produced water were adjusted to represent more challenging treatment conditions by adding $Na_2SO_4$ to AMD and diluting produced water to achieve initial concentration indicated in Table 2 below.

TABLE 2

| Concentration | Barium (Produced Water) | Sulfate (AMD) | Mixing ratio (Produced:AMD) |
|---|---|---|---|
| Low | 11,474 ± 299 | 1,172 ± 19 | 1:9 |
| High | 19,115 ± 451 | 2,150 ± 31 | 1:8 |

Figure 1:
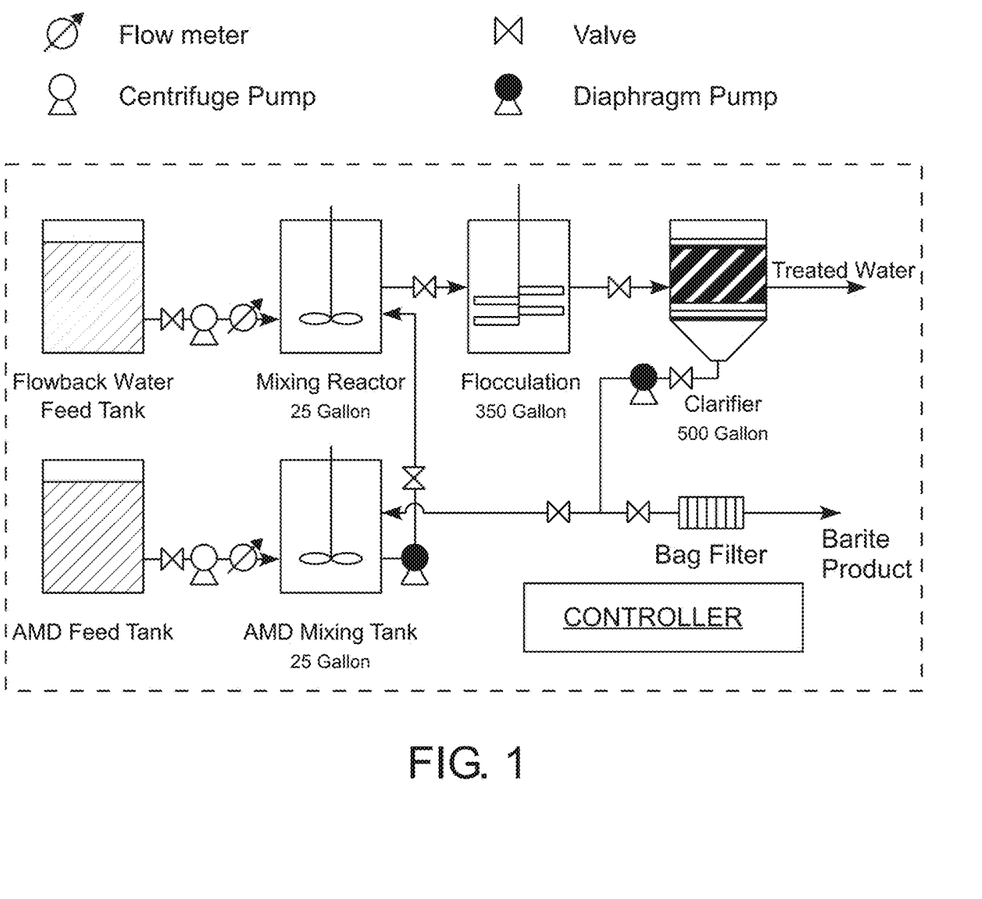
FIG. 1 illustrates a schematic diagram of an embodiment of a pilot scale system hereof.

The adjustment of barium and sulfate was determined in the field with turbidimetric method and validated by laboratory analysis As described above, unit processes in a representative pilot-scale treatment system as illustrated in FIG. 1 included rapid mixing, flocculation, sedimentation and sludge recycling. Two 25-gallon tanks equipped with variable-speed electric mixers (80-4000 rpm) were used as a rapid mixing tank and an AMD mixing tank. The mixing speed of rapid mixers was approximately 1600 rpm based on the conversion from power input. The mixing speed of rapid mixers was adjusted to 1600 rpm to ensure effective mixing as evidenced by G value of 290 $s^{-1}$. A 300-gallon tank equipped with a paddle mixer was used as a flocculation tank with the mixing speed used for flocculation adjusted to 8 rpm to reach a Gt value of 83,800. A 500-gallon conical-bottom settling tank was equipped with a tube settler to ensure better separation of suspended solids. Tube settlers may, for example, increase settling capacity by reducing the vertical distance a suspended particle must travel. Representative designs for the paddle mixer, flocculation tank, and settling tank are illustrated schematically shown in FIG. 1. The total influent flow rate of produced water and AMD in a number of studies was targeted at 5 GPM, while the flow rate of the recycled sludge was targeted at 5 GPM. The total suspended solids or TSS of the sludge was 7.5% and the diaphragm pump was used to recycle such high solids concentration back to AMD mixing reactor.

Prior to pilot-scale tests described above, bench-scale studies were performed using a six-paddle jar tester (available from Phipps & Bird, Richmond, Va.) to optimize operating conditions for turbidity and iron removal. Rapid mixing in those bench-scale studies was conducted for 1 min at a speed of 300 rpm, followed by slow mixing for 25 min at a speed of 25 rpm and settling for 30 min.

Cation and anion analysis was performed using atomic absorption spectroscopy or AAS (model 1000 AAS, available from Perkin-Elmer of Waltham, Mass. US) and ion chromatography (model ICS-1100, available from Thermo Scientific of Waltham, Mass. US), respectively. Filtered samples for AAS analysis were diluted with 2% nitric acid and 0.15% KCl solution to eliminate ionization interference during AAS analysis for Ba and Sr. For dissolved iron analysis, samples were filtered with 0.22-μm membrane to eliminate the interference of sub-micron particles with significant iron content.

A high-resolution Apex Gamma spectrometry system (available from Ortec of Oak Ridge, Tenn.) with a high-purity Germanium detector was used to quantify the activity of radionuclides. Prior to Ra analysis, samples were placed in 47 mm petri dishes, sealed by vinyl electrical tape, and kept for at least 2 days to ensure equilibrium between Ra-228 and Ac-228. Ra-226 activity was analyzed by measuring gamma ray emission at 186 KeV, while Ac-228 activity was analyzed based on multiple gamma ray emissions at 270, 338, 911, and 964 KeV. Ra-228 activity was calculated based on the activity of its equilibrium progeny Ac-228.

Analytical instruments for on-site measurement included Hach colorimeter available from Hach Company of Loveland, Colo. US, pH meter, oven, vacuum pump, hot plate, filtration cell and balance. The on-site measurements for barium (Hach Method 10251) and sulfate (Hach Method 8051) were conducted using Hach turbidimetric methods. Comparison between Hach method and AAS method for dissolved barium and ion chromatography for sulfate measurement was performed under the conditions that are relevant for shale gas wastewater. It was found that dissolved sulfate measurements by these two analytical methods were in good agreement. However, for barium analysis, the turbidimetric method is reliable when strontium concentration is close to or less than barium concentration (Hach Method 10251). The total dissolved iron and ferrous iron on site analyses were conducted by FerroVer Method (Hach Method 10249) and 1,10-phenanthroline method (Hach Method 8146), respectively. The ferric ion concentration was calculated from the difference between total iron and ferrous iron concentration.

Characterization of solids precipitated in the mixing reactor in terms of morphology and chemical composition was performed using scanning electron microscopy (SEM, Philips XL30, FEI Co., Hillsboro, Oreg. US) and energy dispersive X-ray spectroscopy (EDX, EDAS Inc., Mahwah, N.J.), respectively. The solids sampled from the mixing reactor were diluted 500 to 1,000 times with deionized or DI water and deposited on a 0.45 μm Millipore membrane on site to prevent particle agglomeration and stacking of particles on membrane surface. After the membrane samples were completely dried, they were sputter coated with palladium for 60 s in a vacuum at a current intensity of 40 mA to increase the electrical conductivity of the samples. The particle size distribution was obtained by measuring the size of 200 particles in SEM images.

Water-soluble alkaline earth metals (as calcium) were measured with solids sample collected from the sludge return line. The sludge samples were filtered through 0.7-μm glass fiber membrane. Approximately 2 g of solids were retained on the membrane surface, which was calculated based on TSS of sludge (7.5%). After the solids were completely dried, 1 g of the dry solids were collected from the membrane surface and soaked in 50 mL of DI water. Sealed samples were placed on a rotary shaker and allowed to rotate for 1 hour. The suspension was then filtered through 0.45-μm membrane and the total alkaline earth metals in the liquid permeate was measured using EDTA titration method (Standard Method 2340).

The water-soluble alkaline earth metal (as calcium) was calculated using Equation 1.

$$m = \frac{50 C_{EDTA} V_{EDTA} M_{Ca}}{V_{permeate} m_s} \quad (1)$$

wherein m is the water-soluble alkaline earth metal as calcium (mg/kg); $V_{EDTA}$ is the volume of EDTA used (mL); $V_{permeate}$ is the volume of permeate used (mL); $M_{Ca}$ is the molar mass of calcium (40,000 mg/mol); $C_{EDTA}$ is the concentration of EDTA standard (mol/L) and ms is the mass of solids used for alkaline earth metal extraction (g).

Presence of dissolved sulfate in the fracturing fluid may be of concern because of the potential to cause mineral scaling, particularly in Marcellus Shale that is rich in Ba, Sr and Ca. See, for example, He, C., Zhang, T., and Vidic, R. D. Use of abandoned mine drainage for the development of unconventional gas resources, *Disruptive Science and Technology*, 1(2013), 169-176; He, C., Li, M., Liu, W., Barbot, E. and Vidic, R. D. Kinetics and equilibrium of barium and strontium sulfate formation in Marcellus Shale produced water, *Journal of Environmental Engineering*, 140(2014), B4014001. Therefore, the sulfate concentration in the hydraulic fracturing fluid is generally limited to 100 mg/L. It was previously reported that mixing of AMD and produced water requires more than 10 hours to reach precipitation equilibrium as indicated by conductivity analysis. It has also been reported that barium sulfate precipitation is very rapid and reaches equilibrium within 30 min when excess sulfate is added to produced water, while Sr concentration would keep declining for more than 24 hours. Because the target sulfate concentration in hydraulic fracturing fluid is below 100 mg/L and it is desirable to minimize the size of the treatment plant, slow celestite and gypsum precipitation reactions were not considered in studies hereof for the control of sulfate in the finished water.

Figure 2:
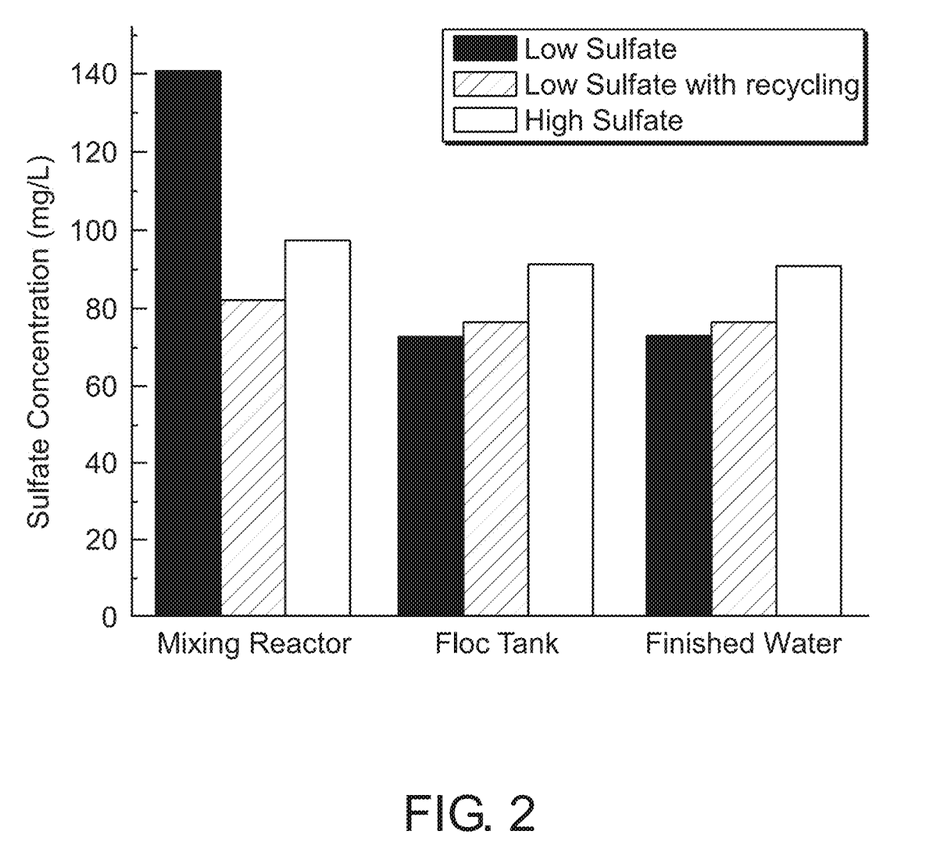
FIG. 2 illustrates sulfate concentration in the treatment units of the pilot-scale system in a number of studies hereof.

The flow rates of produced water and AMD were determined based on the thermodynamic prediction of sulfate concentration in equilibrium with barite solids. Sulfate concentration measurement in the treatment system revealed that barite precipitation reaction proceeded rapidly in the mixing reactor and reached equilibrium after the flocculation tank (FIG. 2). Such behavior was expected because the barite saturation index as set forth in Equation 2

$$\left( SI = \log \frac{\text{Ion Activity Product}}{K_{sp}} \right) \quad (2)$$

was greater than 4.0 for all experimental conditions evaluated in this study, which corresponds to rapid barite precipitation. In equation 2, $K_{sp}$ is the solubility product of barite (barium sulfate) at the temperature under study and describes the amount of a chemical compound which can be dissolved in a water and remain in solution for an infinite period of time. In a more general sense, the Ion Activity Product or IAP is {Ba}{SO$_4$}, wherein {Ba} is the barium activity and {SO$_4$} is the sulfate activity. Under equilibrium conditions IAP=$K_{sp}$. If a water is undersatuated with a compound, IAP<$K_{sp}$; and if a water is supersaturated with a compound IAP>$K_{sp}$. Another observation from results in FIG. 2 is that the sulfate concentration in the finished water is reduced to below 100 mg/L for all three experimental conditions by adjusting the mixing ratio of produced water and AMD.

Figure 3A:
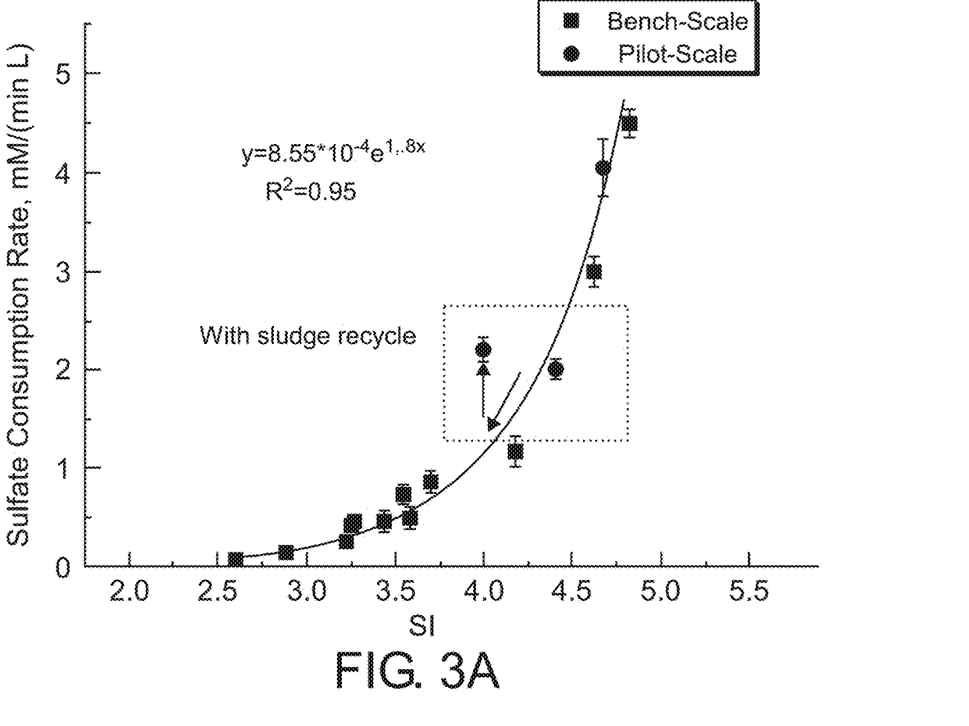
FIG. 3A illustrates sulfate consumption rate as a function of saturation index (the two highest SI conditions in bench-scale tests were achieved by mixing $Na_2SO_4$ and $BaCl_2$), wherein the error bars indicate 95% confidence interval.

The decrease in saturation index will lead to slower homogeneous nucleation rate, while the increase in seed concentration will promote the seeded growth rate (Nancollas and Purdie, 1964). The sulfate consumption rate as a function of saturation index observed in bench-scale and pilot-scale tests is shown in FIG. 3A. The reaction rate increases sharply for SI>3.0, which is in agreement with rapid barite precipitation. Bench-scale tests were designed to evaluate homogenous nucleation reaction and the rate expression was fitted well with an exponential curve ($R^2$=0.95). The average sulfate consumption rate in the rapid mix reactor of the pilot-scale test without sludge recycling was 2.0 and 4.2 mM/(min) for low (SI=4.4) and high (SI=4.7) concentration, respectively, and was in excellent agreement with the bench-scale tests (see FIG. 3A).

Experiments conducted at low concentration with sludge recycling reduced SI from 4.4 to 4.0 due to dilution, but the total suspended solids (TSS) in the mixing reactor increased from 0.2 to 3.9 wt. %. The average sulfate consumption rate in the mixing reactor increased from 2.0 to 2.2 mM/(min) despite a 50% reduction in hydraulic retention time in the reactor caused by sludge recycling. Sulfate consumption with sludge recycling was significantly above the values observed for homogenous nucleation. These results indicate that the seeded growth was effectively promoted by sludge recycling and that growth of existing barite particle comprised a significant portion of sulfate consumption (i.e., 48%) under these conditions.

It has been reported that barium sulfate precipitation reaction could become very slow and require over 5 hours to reach equilibrium when the initial saturation for barite is low (e.g., SI<2.20). For such a case, the sludge recycling is very beneficial to increase barite precipitation rate by promoting the seeded growth.

While dissolved sulfate can be reduced to acceptable level, coagulation may be required prior to settling to facilitate removal of fine barite particles formed in this process. Dissolved iron typically present in AMD can potentially serve as the internal coagulant to reduce the cost and total life cycle impact of the proposed AMD use as make up water for hydraulic fracturing.

The pilot-scale experiment with pH adjustment by adding NaOH was conducted at low concentration conditions. Initial concentrations of $Fe^{3+}$ and $Fe^{2+}$ in the mixture were 26.7 mg/L and 8.1 mg/L, respectively. Bench-scale jar tests revealed that the optimum pH for turbidity and iron removal was between 7.0 and 7.5, when the turbidity of the supernatant was reduced to 2 NTU and the total iron was reduced to 0.1 mg/L.

Turbidity and total iron in the effluent from the pilot system operated at pH 7.5 were 3 NTU and 0.1 mg/L, respectively, indicating that iron contained in the wastewater effectively served as coagulant to enhance solids removal.

Although aeration was not applied in the pilot-scale system, the total iron was reduced to a desired level at pH 7.5. The $Fe^{2+}$ concentration in the effluent of the rapid mix reactor, flocculation tank and settling tank was 0.66 mg/L, 0.18 mg/L and 0.08 mg/L, respectively, while the $Fe^{3+}$ concentration was reduced to below the detection limit (0.1 mg/L for Hach Method 10249) in the rapid mix reactor.

The rate equation developed by Singer and Stumm (1970) was incorporated in the PHREEQC model to predict $Fe^{2+}$ removal. Singer, P. C. and Stumm, W., "Acidic Mine Drainage: The Rate-Determining Step, *Science* 167(3921), 1121-1123 (1970). PHREEQC is a computer program designed to perform a wide variety of aqueous geochemical calculations. See, for example, Pankhurst, D A, and Apello, C A J, Description of Input and Examples for PHREEQC Version 3—A Computer Program for Speciation, Batch-Reaction, One-Dimensional Transport, and Inverse Geochemical Calculations. Chapter 43 of Section A, Groundwater Book 6, Modeling Techniques, US Department of the Interior, US Geological Survey (2013). The kinetic model predicted that $Fe^{2+}$ would be reduced from 8.1 to 5.8 mg/L after 1 min of contact time at the dissolved oxygen concentration of 4 mg/L. Jar tests revealed that the $Fe^{2+}$ concentration decreased from 26.7 mg/L to 0.12 mg/L after 1 minute of rapid mixing, while the $Fe^{2+}$ concentration was reduced from 8.1 mg/L to 0.78 mg/L. The difference between measured and predicted $Fe^{2+}$ concentrations may, for example, (and without limitation to any particular mechanism) be a result to the presence of heavy metals (for example, $Cu^{2+}$) that catalyzed the oxidation reaction and/or the incorporation of ferrous ion into ferric hydroxide by coprecipitation.

The effective use of iron contained in AMD as coagulant for solids separation reveals the additional merits for using this wastewater as make-up water for produced water reuse.

As listed in Table 3, the quality of finished water from the proposed treatment process enables unrestricted use for hydraulic fracturing. However, the management of the solid waste generated from this process is still a concern because of its elevated radioactivity.

TABLE 3

| | |
|---|---|
| Ra-226 in Effluent | <60 pCi/L |
| Ra-228 in Effluent | <10 pCi/L |
| Ra removal | >99% |
| Total Iron (mg/L) | 0.1 |
| Sulfate (mg/L) | 73 ± 3 |
| Turbidity (NTU) | 3 |
| pH | 7.3 ± 0.01 |

As sulfate concentration in the influent was in excess compared to barium, complete removal of barium resulted in complete Ra removal as evidenced by Ra concentration in the finished water below the detection limit (60 pCi/L for Ra-226 and 10 pCi/L for Ra-228). The solids generated in the pilot-scale system contained 648 pCi/g Ra-226 and 53 pCi/g Ra-228, respectively, which far exceeded the limits for technologically enhanced naturally occurring radioactive materials or TENORM disposal in municipal solid waste landfills (5-50 pCi/g depending on state regulations). In general, "technologically enhanced: means that the radiological, physical and/or chemical properties of the radioactive material have been concentrated of further altered by having been processed, or beneficiated or disturbed in a way that increases the potential for human and/or environmental exposures. Reuse of Ra-enriched $BaSO_4$ particles formed in this treatment process as, for example, a weighting agent in drilling mud formulation or other composition used in subterranean hydrocarbon recovery can potentially reduce the TENORM loading in municipal landfills in Pennsylvania. Previous study has demonstrated that the radioactivity from Ra-enriched barite particles is not a concern even for on-site workers that store the radioactive sludge as long as they are separated from the stored sludge by about 3-5 m. Therefore, the radioactive sludge produced from the co-treatment produced water and AMD is not of concern for safe handling/storage prior to reuse. In essence, this approach for management of barite produced in this process will result in the deposition of Ra-enriched $BaSO_4$ in the shale formation because most of the weighting agent in the drilling mud is lost by adsorption to the shale formation during horizontal drilling. However, the barite particles formed in this process must be much larger to meet the API standards so that they can be used for unconventional well drilling. The API standards for barite particles are summarized in Table 4 below (API, Specification for Drilling Fluids Materials, API Specification 13A, $18^{th}$ edition, (2010)).

TABLE 4

| Requirement for barite reuse | Standard |
|---|---|
| Density | >4.1 g/cm³ |
| Water-soluble alkaline earth metals (as Ca) | <250 mg/kg |
| Residue larger than 75 µm | <3.0% |
| Particle smaller than 6 µm | <30% |

Figure 3B:
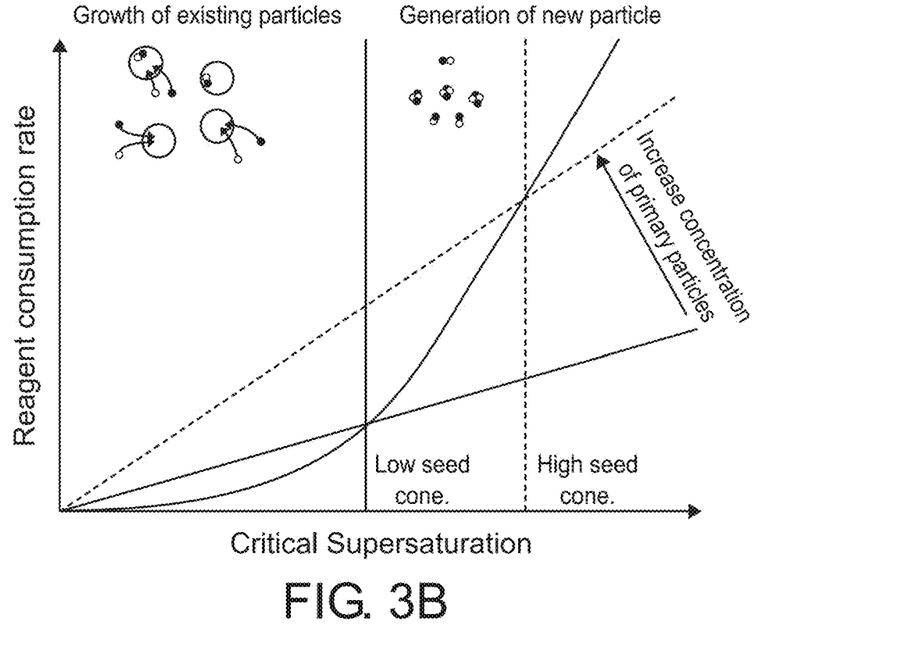
FIG. 3B illustrates a schematic illustration of the competition between generation of new particles and growth of existing particles as a function of supersaturation level and concentration of primary particles, wherein the curve represents homogeneous nucleation rate and the two linear lines represent growth rate in the presence of primary particles.

To increase particle size, it is desirable to promote seeded growth while limiting the generation of new particles through homogeneous nucleation. FIG. 3B illustrates a schematic representation of the competition between homogeneous nucleation and seeded growth at different levels of supersaturation and concentrations of primary particles (seeds). The generation rate of new particles (homogeneous nucleation) is prevalent at higher supersaturation level (which is typical for barite precipitation from produced water as a result of its high barium concentration), resulting in generation of smaller particles. The homogeneous nucleation can be suppressed by increasing the total surface area of primary particles and/or reducing the initial supersaturation in the reactor. The possibility of growing barium sulfate particles to meet specification for use in drilling fluid based on such relationships was evaluated in studies hereof.

Figure 4:
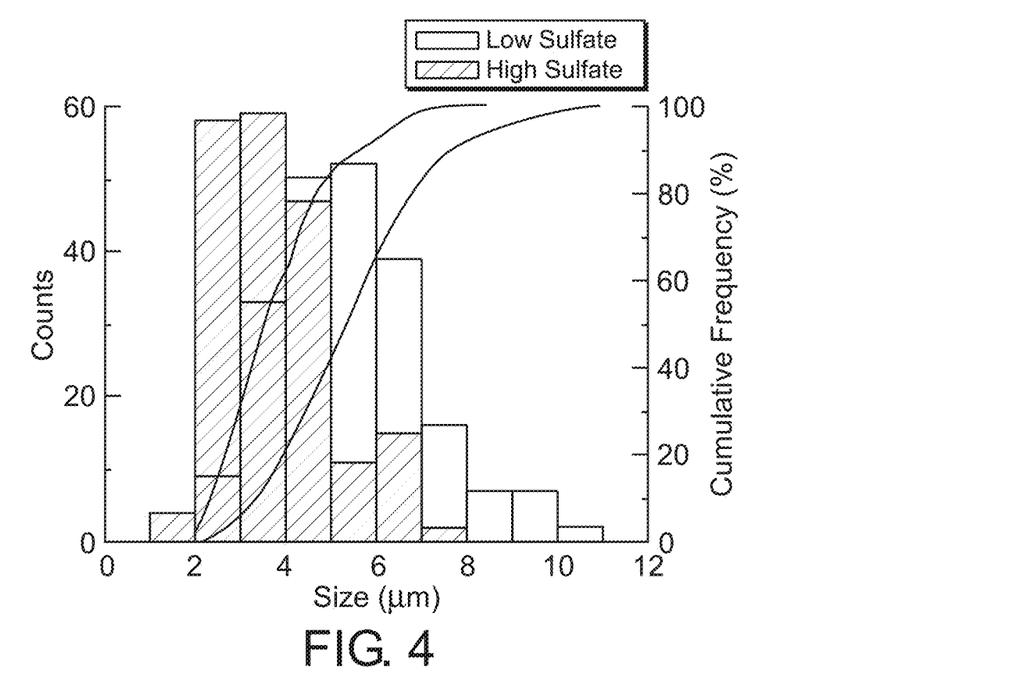
FIG. 4 illustrates particle size distributions for barium sulfate particles formed under low sulfate and under high sulfate concentrations without sludge recycling.

At the first stage of pilot scale studies hereof without pH adjustment, the pH was 2.8 and barium sulfate precipitation was the dominant chemical reaction in the system. Particle size analysis of samples from the rapid mixing reactor revealed the average particle size of 5.42±1.61 and 3.77±1.23 µm for low and high supersaturation conditions, respectively. The results of particle size analysis shown in FIG. 4 illustrate that the increase in saturation level yields smaller particles, which agrees with the theory that homogeneous nucleation is favored at high saturation level. The number percent of particles that are smaller than 6 µm was 63 and 89% for the low and high sulfate concentrations, respectively, which is not compatible with the size requirement specified by API.

To promote the growth of primary particles, sludge recycling was utilized at low sulfate concentration to further reduce supersaturation level (SI decreased from 4.41 to 4.08 in a number of studies) and increase the concentration of seed particles in the reactor. As discussed above, reduction in supersaturation level decreases homogeneous nucleation rate, but the observed increase in average sulfate consumptions rate in the rapid mixing reactor indicated that the growth of primary particles is promoted by sludge recycling.

Figure 5:
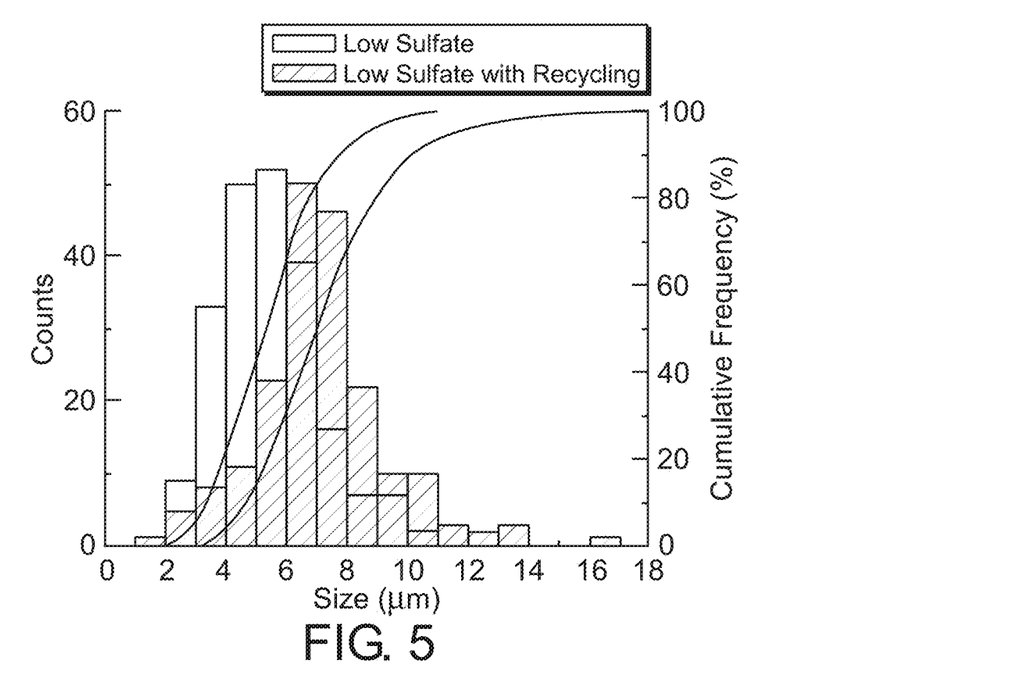
FIG. 5 illustrates particle size distributions for barium sulfate particles formed under low sulfate and under high sulfate concentrations with sludge recycling.

As illustrated in FIG. 5, introduction of sludge recycling reduced cumulative frequency of the particles that are smaller than 6 μm from 63 to 27%, suggesting significant improvement in the seeded growth reaction pathway. In a number of embodiments hereof, the average saturation index within the reactor (over time) is maintained within the range of approximately 2.5 to 4.25.

Figure 6:
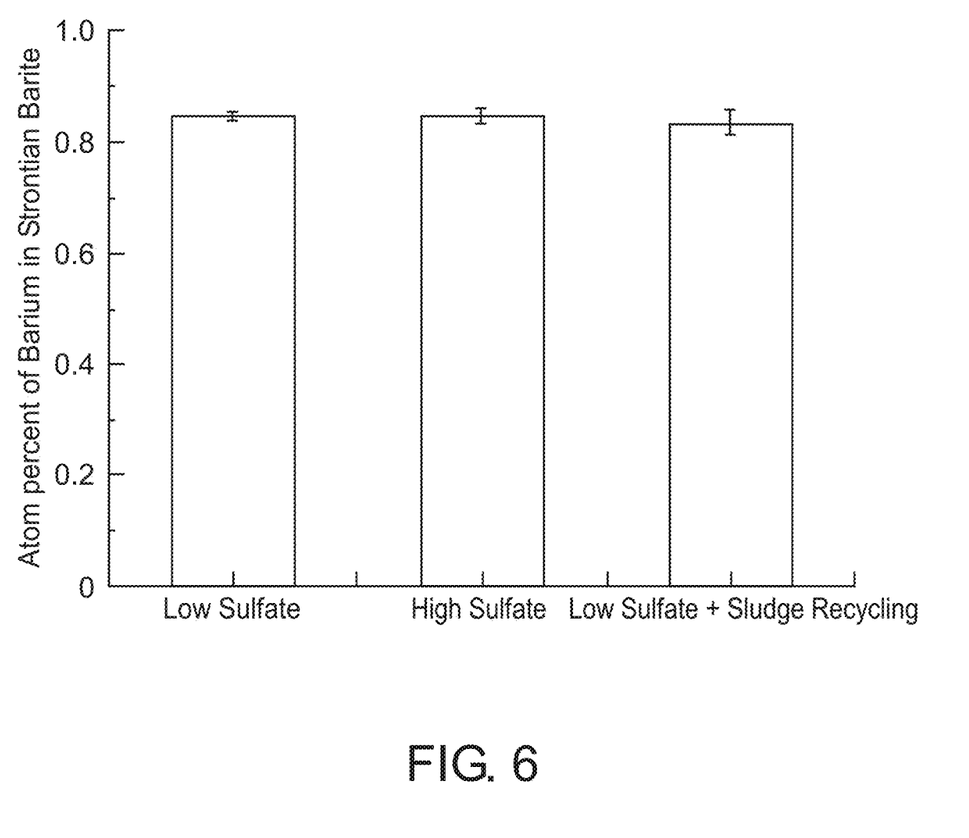
FIG. 6 illustrates the atom percentage of barium in strontian barite ($BaSrSO_4$), wherein, for each experimental condition, the average and standard error were calculated based on the measurement of six particles.
Figure 7A:
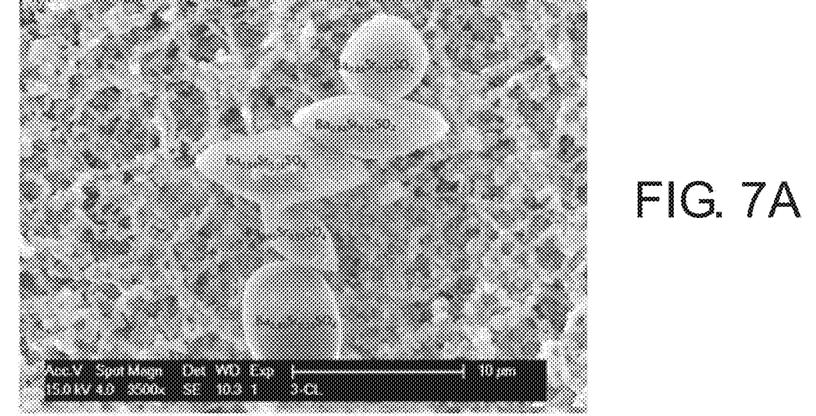
FIG. 7A is a photomicrograph illustrating morphology and qualitative chemical composition of mineral precipitates formed at low sulfate concentration.
Figure 7B:
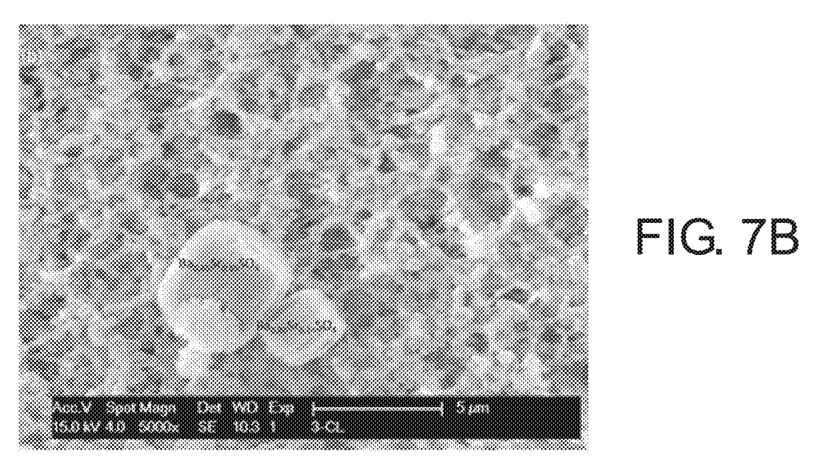
FIG. 7B is a photomicrograph illustrating morphology and qualitative chemical composition of mineral precipitates formed at high sulfate concentration.
Figure 7C:
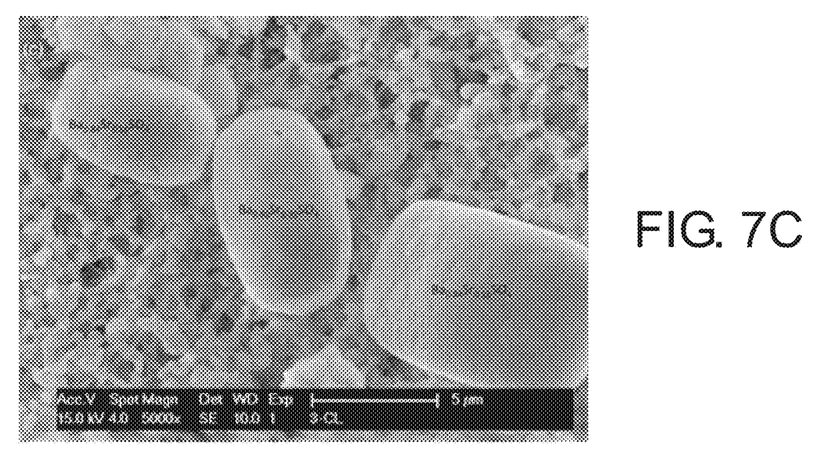
FIG. 7C is a photomicrograph illustrating morphology and qualitative chemical composition of mineral precipitates formed at low sulfate concentration with sludge recycling.
Figure 8:
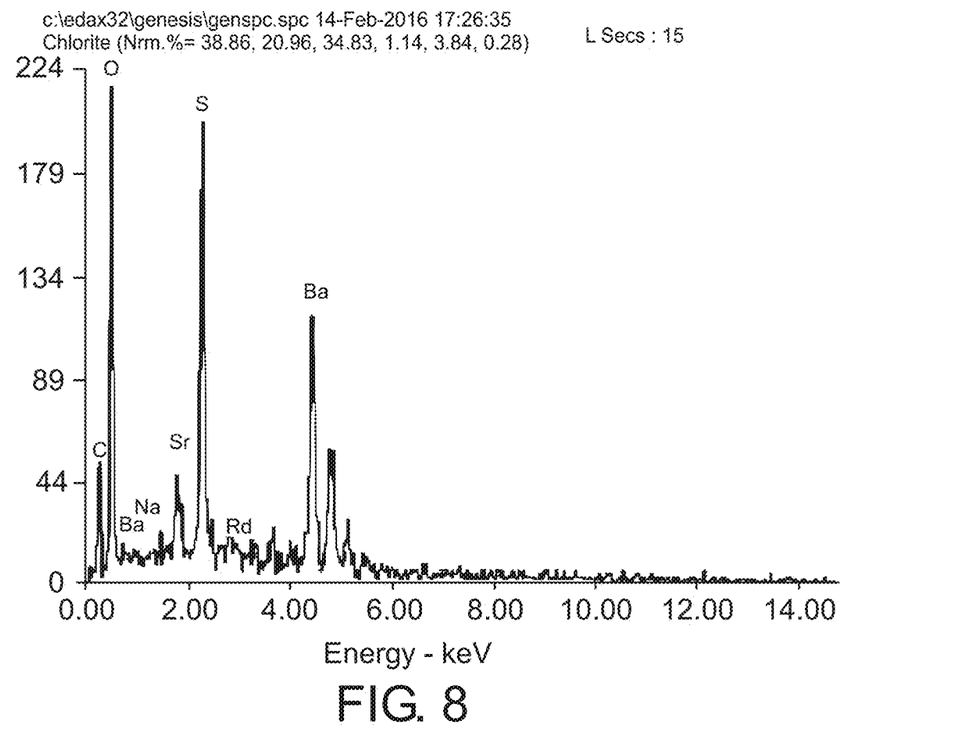
FIG. 8 illustrates a typical spectrum of EDX analysis.

Energy dispersive X-ray spectroscopy or EDX analysis revealed that the precipitates formed in the pilot scale plant were strontian barite (i.e., BaSrSO$_4$) with relatively uniform Ba content (about 84% of cations) for all three experimental conditions evaluated in representative studies hereof (FIG. 6). The incorporation of Sr into BaSO$_4$ occurs primarily through coprecipitation. As can be seen in FIGS. 7A through 7C, Sr content in strontian barite particles is not dependent on the solid morphology. It has been reported that the incorporation of Sr into barium sulfate particles would result in elongation of the particles. However, such phenomenon was observed only at low sulfate concentration conditions evaluated in the studies hereof. At high sulfate concentration (i.e., high supersaturation level), the reaction was governed by homogeneous nucleation rather than crystal growth. A typical spectrum of EDX analysis is illustrated in FIG. 8. The presence of Calcium was not observed in these particles in EDX analysis, indicating that Ca incorporation into the precipitates was negligible, which can be explained by the difference in the ionic radius between barium and calcium. The atom percent of barium in strontian barite obtained in this study was slightly higher than that reported elsewhere, which is a result in differences in the composition of feed solution, reaction time and measurement method.

Particle density measured by submersion method (as described in Klute, A. Methods of soil analysis. Part 1: Physical and mineralogical methods, American Society of Agronomy, Madison, Wis., (1986))—revealed average density of 4.3 g/cm$^3$ based on triplicate measurements, which fulfills the density requirement for the use of barite particles in drilling fluid.

Figure 9:
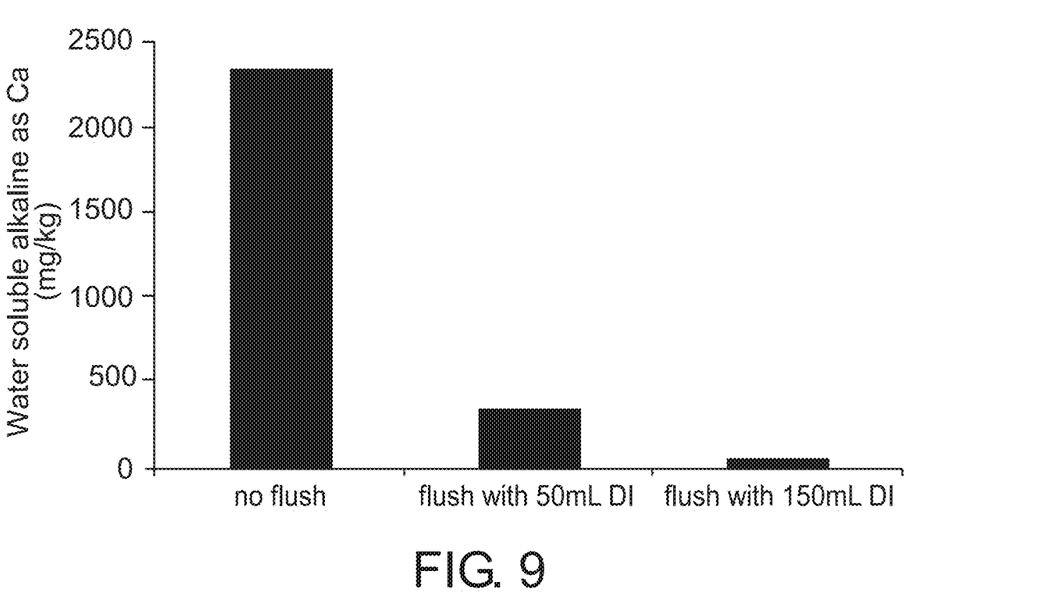
FIG. 9 illustrates water soluble alkaline metals (as calcium) recovered from pilot-scale systems hereof.

Water-soluble alkaline earth metals (as calcium) concentration in particles collected from the settling tank was 2,333 mg/kg. When the particles were washed with 50 and 150 mL of DI water, water-soluble alkaline earth metals concentration was reduced to 348.1 mg/kg and 44.38 mg/kg, respectively (FIG. 9). The reduction in alkaline earth metals content after washing with DI water was likely caused by the removal of ions contained in the liquid retained on the membrane that crystallized during sample drying. This finding combined with the results from EDX analysis suggest that the alkaline earth metals are in the dissolved form and are not incorporated in the particles precipitated in this system.

Therefore, BaSO$_4$ particles recovered from this process meet API specification and can be reused in drilling mud formulation, which can potentially reduce the cost of unconventional gas extraction and relieve the pressure on the management of TENORM associated with produced water reuse. As discussed above, Ra levels in the solids produced in the centralized wastewater treatment (CWT) facilities that employ sulfate precipitation for divalent ion removal (mainly Ba and Sr) are also significantly above the TENORM disposal limit. Therefore, the approaches for barite reuse developed herein may also be used to improve waste management practices in these facilities. Laboratory and field-scale experiments conducted in the studies hereof also demonstrated that the effluent produced by co-treatment of abandoned mine drainage and produced water can meet industry requirements for unrestricted use in hydraulic fracturing in Marcellus Shale. These results indicate that it is possible to reduce the use of fresh water for hydraulic fracturing while at the same time helping to alleviate adverse environmental impacts of abandoned coal mine discharges in Pennsylvania.

Figure 10:
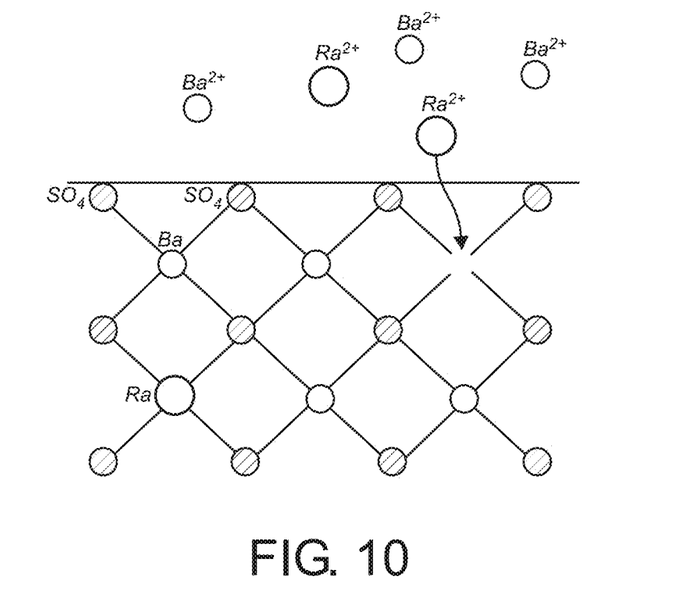
FIG. 10 illustrates a proposed mechanism of radium coprecipitation.
Figure 11:
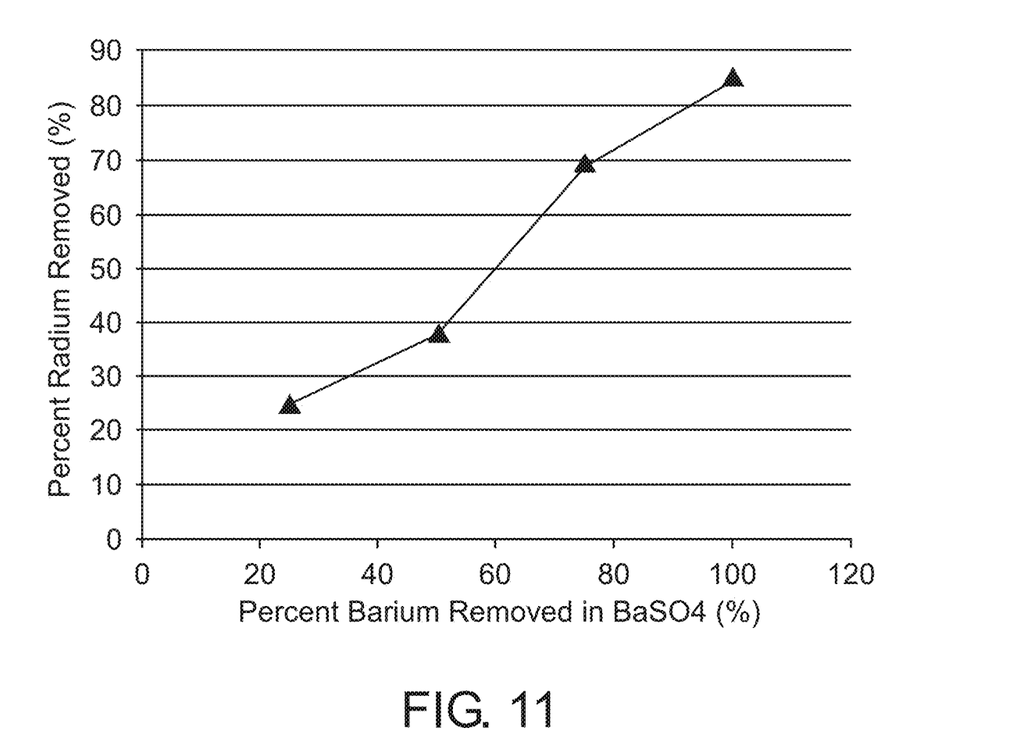
FIG. 11 illustrates percent radium removed from produced water as a function of percent barium removed in barite ($BaSO_4$).

The results of the representative pilot-scale studies hereof revealed that the sulfate was rapidly removed from liquid phase at relatively high barite supersaturation levels so that the sulfate concentration in the effluent is reduced to, for example, below 100 mg/L with appropriate mixing ratio between produced water and AMD. Ferric ion contained in AMD was useful as coagulant to assist the separation of suspended solids by settling. This practice can reduce the cost and total life cycle impact of the use of AMD as a make-up water source for produced water reuse. When the AMD is rich in ferrous iron, a separate reactor with aeration will be required for $Fe^{2+}$ oxidation and $Fe^{3+}$ that is formed in situ can be used for the subsequent flocculation process. Radium removal through coprecipitation/adsorption with barium sulfate was in agreement with theoretical predictions and previous results. Without limitation to any particular mechanism, a mechanism for radium co-precipitation is provided in FIG. 10. A distribution equation for radium co-precipitation is set forth in Equation 3.

$$RaSO_4/BaSO_4 = K_d(Ra^{2+}/Ba^{2+}) \qquad (3)$$

wherein $K_d$ is a theoretical distribution coefficient which varies with ionic strength and alkaline earth metal competition, which has been shown to vary experimentally in a range of approximately 1.0 to approximately 7.5. $K_d$ was determined to be approximately 1.54 in a number of studies hereof. Radium removal as a function of percent barium removed in BaSO$_4$ is set forth in FIG. 11.

The results of representative studies hereof demonstrated that the particle size of barium sulfate decreased with an increase in initial barite supersaturation and was below the requirement for barite use as a weighting agent. Introduction of sludge recycling increased the surface area of seeded particles in the system and reduced barite supersaturation to promote the growth of barium sulfate primary particles. The physical and chemical properties of the barium sulfate particles formed in this process meet API requirement for use as a weighting agent in drilling mud, which offers an alternative management option for the Ra-enriched solid waste generated from co-treatment of produced water AMD. In addition, the barium sulfate reuse methods hereof may be applied for the solid waste generated in centralized wastewater treatment (CWT) facilities, where sodium sulfate addition is employed for produced water treatment. Once again, substantially all radium was removed from the produced water and can be redeposited in subterranean well through use of recovered barite suitable for drilling/well processes.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of treating produced water from subterranean well operations, comprising:

charging produced water into a container via an inlet system of the container to create a liquid mixture of the produced water and an aqueous medium including a source of sulfate ions within the container to precipitate barium from the produced water as barite;

removing an outflow via an outlet in the container;

transmitting the outflow from the container to a settling system; and recycling at least a portion of the outflow including solid, barite particles from the settling system back into the container via the inlet system to promote seeded growth of barite particles within the mixture under conditions such that barite particles removed from a sludge outflow of the settling system include less than 30% of barite particles having a diameter of less than 6 µm.

2. The method of claim 1 wherein an average saturation index of barite in the container is maintained to be at least 3.5.

3. The method of claim 1 wherein pH within the container is maintained at no more than 5.

4. The method of claim 1 wherein the aqueous medium includes water from acid, abandoned or active mine drainage.

5. The method of claim 1 wherein barite particles produced in the method include at least 90% of the radium from the produced water.

6. The method of claim 1 wherein sulfuric acid is added to the container.

7. The method of claim 1 wherein average saturation index of barite in the container is maintained to be at least 2.5.

8. The method of claim 1 wherein average saturation index of barite in the container is maintained to be no greater than 5.

9. The method of claim 1 wherein sulfate ion concentration in the outflow is maintained below 100 mg/L.

10. The method of claim 1 wherein an average saturation index of barite in the container is maintained to be no greater than 4.25.

11. The method of claim 1 wherein the outflow from the container is charged to a flocculation system and the outflow of the flocculation system is charged to the settling system.

12. The method of claim 10 wherein the average saturation index of barite in the container is maintained to be no greater than 4.1.

13. The method of claim 1 wherein the barite particles removed from the sludge outflow are charged to a subterranean formation in a hydrocarbon recovery process.

14. A system for treating produced water from subterranean well operations, comprising:

a container including an inlet system and an outlet system, a source of produced water in fluid connection with the inlet system;

a source of an aqueous medium comprising sulfate ions in fluid connection with the inlet system suitable to precipitate barium in the produced water as barite when a liquid mixture of the produced water and the aqueous medium is formed within the container;

a settling system in fluid connection with the outlet system;

a recycle line in fluid connection with the inlet system of the container to recycle at least a portion of an outflow including solid, barite particles from the settling system back into the container via the inlet system; and a controller to control the system so that barite particles removed from a sludge outflow of the settling system include less than 30% of barite particles having a diameter of less than 6 µm.

15. The system of claim 14 wherein the controller is configured to maintain an average saturation index of barite in the container to be at least 3.5.

16. The system of claim 14 further comprising a flocculation system in fluid connection with the outlet system, the settling system being in fluid connection with an outlet of the flocculation system.

17. The system of claim 14 wherein the source of the aqueous medium comprises acid, abandoned or active mine drainage.

18. The system of claim 14 further comprising a source of sulfuric acid in fluid connection with the inlet of the system.

19. The system of claim 14 wherein the controller is configured to maintain an average saturation index of barite in the container to be at least 2.5.

20. The system of claim 14 wherein the controller is configured to maintain an average saturation index of barite in the container to be no greater than 5.

* * * * *